United States Patent
Camp et al.

(10) Patent No.: US 10,078,582 B2
(45) Date of Patent: Sep. 18, 2018

(54) NON-VOLATILE MEMORY SYSTEM HAVING AN INCREASED EFFECTIVE NUMBER OF SUPPORTED HEAT LEVELS

(71) Applicant: International Business Machines Corporation, Armonk, NY (US)

(72) Inventors: Charles J. Camp, Sugar Land, TX (US); Timothy J. Fisher, Cypress, TX (US); Aaron D. Fry, Richmond, TX (US); Nikolas Ioannou, Zurich (CH); Ioannis Koltsidas, Zurich (CH); Roman Pletka, Uster (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 14/566,639

(22) Filed: Dec. 10, 2014

(65) Prior Publication Data

US 2016/0170870 A1    Jun. 16, 2016

(51) Int. Cl.
*G06F 12/02* (2006.01)
*G06F 12/16* (2006.01)

(52) U.S. Cl.
CPC .... *G06F 12/0246* (2013.01); *G06F 2212/452* (2013.01); *G06F 2212/7208* (2013.01); *G06F 2212/7211* (2013.01)

(58) Field of Classification Search
CPC .................................................. G06F 12/0246
USPC ......................................................... 711/103
See application file for complete search history.

(56) References Cited

U.S. PATENT DOCUMENTS

| | | | |
|---|---|---|---|
| 7,941,591 B2 | 5/2011 | Aviles | |
| 8,185,778 B2 | 5/2012 | Kilzer et al. | |
| 8,285,918 B2 | 10/2012 | Maheshwari | |
| 8,327,110 B2 | 12/2012 | Yamamoto | |
| 8,402,242 B2 | 3/2013 | Hu et al. | |
| 8,463,983 B2 | 6/2013 | Eleftheriou et al. | |
| 8,756,375 B2 | 6/2014 | Flynn | |
| 8,838,935 B2 | 9/2014 | Hinton et al. | |
| 2004/0158675 A1 | 8/2004 | Hirose | |
| 2008/0034154 A1 | 2/2008 | Lee et al. | |
| 2009/0164724 A1 | 6/2009 | Hirose | |
| 2010/0262687 A1 | 10/2010 | Shen et al. | |
| 2011/0066788 A1 | 3/2011 | Eleftheriou et al. | |
| 2011/0087855 A1 | 4/2011 | Frost et al. | |

(Continued)

FOREIGN PATENT DOCUMENTS

| | | |
|---|---|---|
| CN | 102609360 A | 7/2012 |
| EP | 1521268 A2 | 4/2005 |

(Continued)

OTHER PUBLICATIONS

List of IBM Patents or Patent Applications Treated as Related.

(Continued)

*Primary Examiner* — Gautam Sain
(74) *Attorney, Agent, or Firm* — Zilka-Kotab, P.C.

(57) ABSTRACT

A method, according to one embodiment, includes assigning data having a first heat to a first data stream, assigning data having a second heat to a second data stream, and writing the data streams in parallel to page-stripes having a same index across a series of planes of memory. Other systems, methods, and computer program products are described in additional embodiments.

20 Claims, 9 Drawing Sheets

(56) References Cited

U.S. PATENT DOCUMENTS

| | | | |
|---|---|---|---|
| 2011/0093648 A1 | 4/2011 | Belluomini et al. | |
| 2011/0213919 A1 | 9/2011 | Frost et al. | |
| 2012/0079232 A1 | 3/2012 | Hinton et al. | |
| 2012/0166709 A1 | 6/2012 | Chun | |
| 2012/0284587 A1 | 11/2012 | Yu et al. | |
| 2012/0297122 A1 | 11/2012 | Gorobets et al. | |
| 2012/0317337 A1 | 12/2012 | Johar et al. | |
| 2013/0024609 A1* | 1/2013 | Gorobets | G06F 12/0246 711/103 |
| 2013/0054873 A1 | 2/2013 | Belluomini et al. | |
| 2013/0061019 A1 | 3/2013 | Fitzpatrick et al. | |
| 2013/0138875 A1* | 5/2013 | Kamphenkel | G06F 13/1684 711/103 |
| 2013/0159626 A1 | 6/2013 | Katz et al. | |
| 2013/0185526 A1 | 7/2013 | de la Iglesia et al. | |
| 2013/0205183 A1 | 8/2013 | Fillingim et al. | |
| 2013/0332668 A1 | 12/2013 | Diep et al. | |
| 2014/0068157 A1 | 3/2014 | Makuni et al. | |
| 2014/0075099 A1 | 3/2014 | Ooneda | |
| 2014/0095775 A1 | 4/2014 | Talagala et al. | |
| 2014/0223094 A1* | 8/2014 | Baderdinni | G06F 3/0689 711/114 |
| 2014/0304454 A1 | 10/2014 | Ellis et al. | |
| 2014/0351526 A1 | 11/2014 | Peterson | |
| 2015/0052395 A1 | 2/2015 | Wipfel | |
| 2015/0177995 A1 | 6/2015 | Camp et al. | |
| 2015/0220385 A1* | 8/2015 | Wood | G06F 11/108 714/6.24 |
| 2016/0092352 A1 | 3/2016 | Camp et al. | |
| 2016/0179678 A1 | 6/2016 | Camp et al. | |

FOREIGN PATENT DOCUMENTS

| | | |
|---|---|---|
| JP | 2004185199 A | 7/2004 |
| KR | 20130048261 A | 5/2013 |
| WO | 2012148828 A2 | 11/2012 |

OTHER PUBLICATIONS

Non-Final Office Action from U.S. Appl. No. 14/578,195, dated Jun. 16, 2016.

Non-Final Office Action from U.S. Appl. No. 14/497,243, dated Jun. 21, 2016.

Appendix F—Statement of Relevance of Non-Translated Foreign Document—CN102609360.

U.S. Appl. No. 14/497,243, filed Sep. 25, 2014.

Hu et al., "Write Amplification Analysis in Flash-Based Solid State Drives," SYSTOR'09, May 4-6, 2009, pp. 1-9.

Hu et al., "The Fundamental Limit of Flash Random Write Performance: Understanding, Analysis and Performance Modelling," IBM Research, Mar. 31, 2010, pp. 1-15.

"Write Amplification," Wikipedia, Last Modified Jan. 21, 2014, pp. 1-13.

Min et al., "SFS: random write considered harmful in solid state drives," FAST'12 Proceedings of the 10th USENIX conference on File and Storage Technologies, Feb. 14, 2012, pp. 1-16.

Hu et al., "Container Marking: Combining Data Placement, Garbage Collection and Wear Levelling for Flash," IBM Research, May 5, 2011, pp. 1-11.

Ramachandran, U. et al.; "Dynamic Data Fusion for Future Sensor Networks," ACM Transactions on Sensor Networks (TOSN), No. 3, 2006, pp. 404-443.

Deng, Y. et al., "Architectures and optimization methods of flash memory based storage system," Journal of Systems Architecture 57, 2011, pp. 214-227.

Chung et al., "A survey of Flash Translation Layer," Journal of Systems Architecture 55, 2009, pp. 332-343.

Dirik et al., "The Performance of PC Solid-State Disks (SSDs) as a Function of Bandwidth, Concurrency, Device Architecture, and System Organization," ISCA'09, Jun. 20-24, 2009, pp. 279-289.

Patterson et al., "A Case for Redundant Arrays of Inexpensive Disks (RAID)," in Proceedings of the 1988 ACM SIGMOD International Conference on Management of Data, Jun. 1988, pp. 3-14.

Menon, "A performance Comparison of RAID-5 and Log-Structured Arrays," in Proceedings of the 4th IEEE International Symposium on High Performance Distributed Computing, 1995, pp. 167-178.

Camp et al., U.S. Appl. No. 14/578,195, filed Dec. 19, 2014.

Anonymous, "Method for better performance by smart garbage collector invocation on SSD in high reliability environment," ip.com, No. 000223784, Nov. 29, 2012, pp. 1-6.

Rodeh, O. et. al., "Visualizing Block IO Workloads," IBM Research Report, Oct. 18, 2013, pp. 1-28.

Camp et. al., U.S. Appl. No. 14/139,925, filed Dec. 24, 2013.

Ioannou et al., U.S. Appl. No. 14/866,315, filed Sep. 25, 2015.

Non-Final Office Action from U.S. Appl. No. 14/578,195, dated Dec. 15, 2016.

Notice of Allowance from U.S. Appl. No. 14/497,243, dated Dec. 21, 2016.

* cited by examiner

NON-VOLATILE MEMORY SYSTEM HAVING AN INCREASED EFFECTIVE NUMBER OF SUPPORTED HEAT LEVELS

BACKGROUND

The present invention relates to non-volatile memory, e.g., such as NAND Flash memory, and more specifically, this invention relates to a non-volatile memory system having an increased effective number of supported heat levels without increasing an associated number of blocks open for writing.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of a minimal erase unit (a block) is typically 256 pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash based memory cells exhibit read errors and/or failures due to wear or other reasons, additional redundancy may be used within memory pages as well as across memory chips (e.g., RAID-5 and RAID-6 schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-face writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as tong as possible to maximize the amount of invalidated data in block, and thus reduce the number of valid pages that are relocated, as relocating data causes additional write operations, and thereby increases write amplification.

BRIEF SUMMARY

A method, according to one embodiment, includes assigning data having a first heat to a first data stream, assigning data having a second heat to a second data stream, and writing the data streams in parallel to page-stripes having a same index across a series of planes of memory.

A system, according to another embodiment, includes a memory, and a controller configured to assign data having a first heat to a first data stream, assigning data having a second heat to a second data stream, and write the data streams in parallel to page-stripes having a same index across a series of planes of the memory.

A computer program product, according to yet another embodiment, includes a computer readable storage medium having program instructions embodied therewith, the program instructions readable and/or executable by a controller to cause the controller to: assign, by the controller, data having a first heat to a first data stream, assign, by the controller, data having a second heat to a second data stream, and write, by the controller, the data streams in parallel to page-stripes having a same index across a series of planes of memory.

Other aspects and embodiments of the present invention will become apparent from the following detailed description, which, when taken in conjunction with the drawings, illustrate by way of example the principles of the invention.

DETAILED DESCRIPTION

Figure 1:
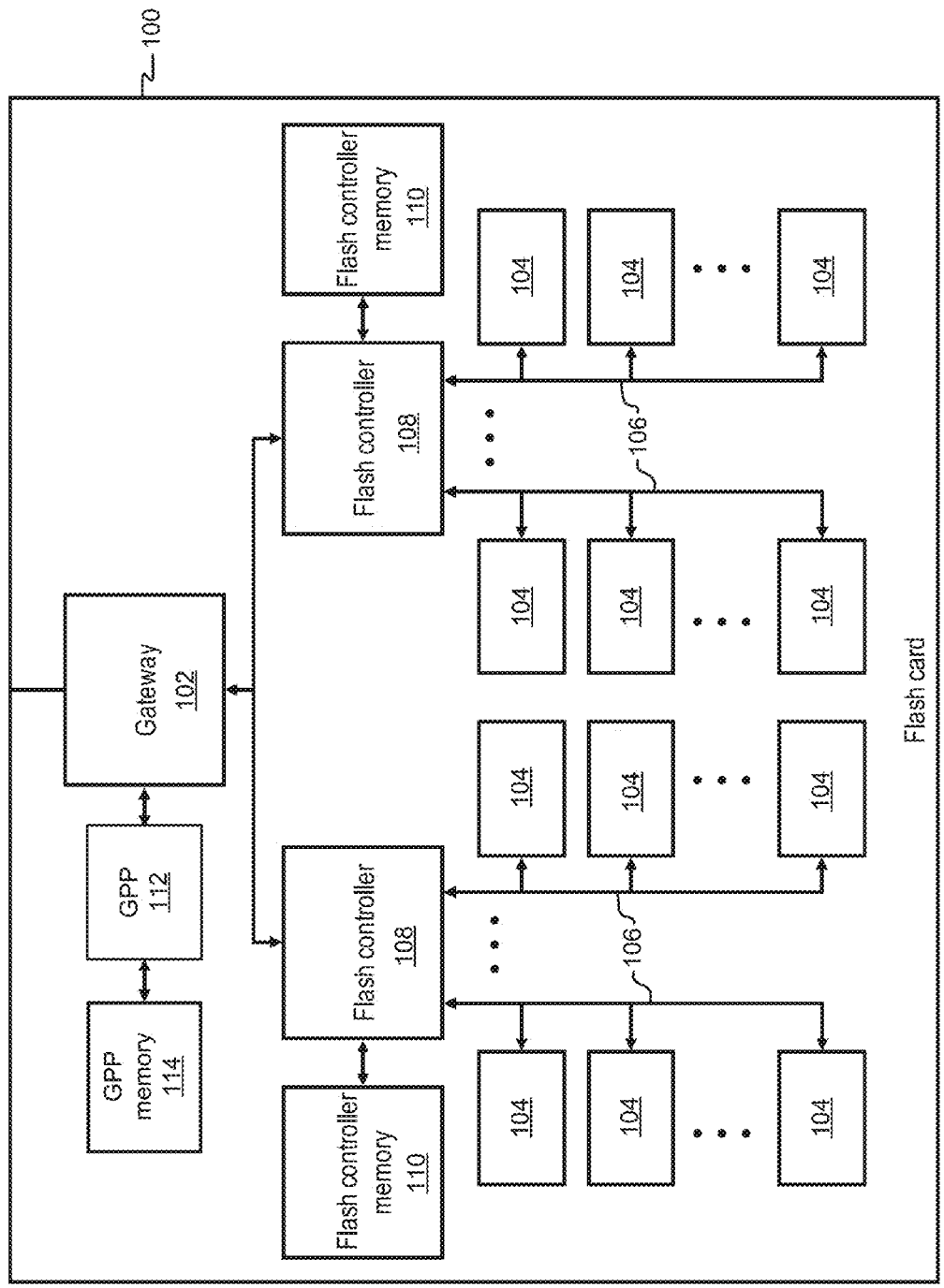
FIG. 1 shows a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, as used herein, the term "about" with reference to some stated value may refer to the stated value ±10% of said value.

The following description discloses several preferred embodiments of data storage systems, as well as operation and/or component parts thereof. Various embodiments described herein are able to achieve an increased effective number of supported heat levels in non-volatile memory without increasing an associated number of blocks open for writes, as will be described in further detail below.

It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a method includes assigning data having a first heat to a first data stream, assigning data having a second heat to a second data stream, and writing the data streams in parallel to page-stripes having a same index across a series of planes of memory.

In another general embodiment, a system includes a memory, and a controller configured to assign data having a first heat to a first data stream, assigning data having a second heat to a second data stream, and write the data streams in parallel to page-stripes having a same index across a series of planes of the memory.

In yet another general embodiment, a computer program product includes a computer readable storage medium having program instructions embodied therewith, the program instructions readable and/or executable by a controller to cause the controller to: assign, by the controller, data having a first heat to a first data stream, assign, by the controller, data having a second heat to a second data stream, and write, by the controller, the data streams in parallel to page-stripes having a same index across a series of planes of memory.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory con roller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
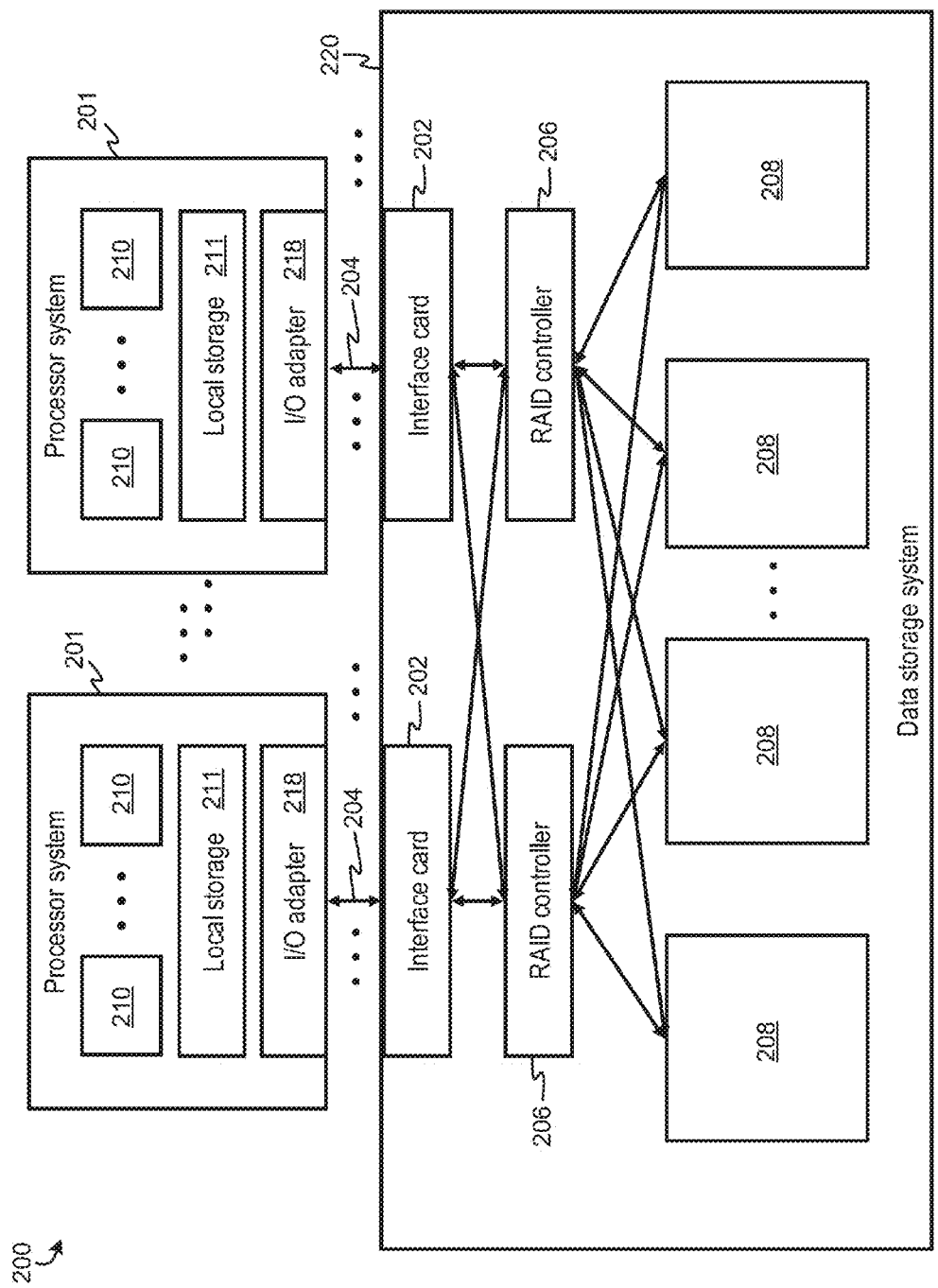
FIG. 2 shows a data storage system architecture, in accordance with one embodiment.

As previously mentioned, memory card 100 may be implemented in various types of data storage systems, depending on the e desired embodiment. FIG. 2 illustrates a data storage system architecture 200 is shown according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 814 of FIG. 8, ROM 816 of FIG. 8, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, block-stripes may be identified for being reclaimed and/or relocated.

It should also be noted that a block-stripe includes any multiple of the physical memory block, which is a minimal physical unit of erasure. Moreover, the organization of memory blocks into block-stripes allows for adding RAID-like parity protection schemes among memory blocks from different memory chips, memory planes and/or channels as well as significantly enhancing performance through higher parallelism.

According to an exemplary embodiment, which is in no way intended to limit the invention, memory controllers (e.g., see 108 of FIG. 1) may internally perform a garbage collection. As previously mentioned, the garbage collection may include selecting a block-stripe to be relocated, after which all data that is still valid on the selected block-stripe may be relocated (e.g., moved). After the still valid data has been relocated, the entire block-stripe may be erased and thereafter, used for storing new data. The amount of data relocated from the garbage collected block-stripe determines the write amplification. Moreover, an efficient way to reduce the write amplification includes implementing heat segregation.

Heat Segregation

In the present context, the "heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Data heat may be determined by monitoring the data and ascertaining an overwrite frequency, implementing an application which indicates the heat of data to be written, implementing a container marker, etc. Illustrative embodiments for monitoring and/or determining heat of data are presented in U.S. Pat. No. 8,463,983, which is herein incorporated by reference. Other known techniques for monitoring and/or determining heat of data may be used.

It should be noted that the number of read requests to and/or read operations performed on a memory block may not come into play when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar heat values, heat segregation may be achieved. In particular, heat segregating methods may group hot memory pages together in certain memory blocks while cold memory pages are grouped together in separate memory blocks. Thus, a heat-segregated block-stripe tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same block-stripe as the hot data being relocated. Therefore the write amplification incurred by performing garbage collection is much lower for embodiments implementing heat segregation.

Secondly, the relative heat of data can be utilized for wear leveling purposes. For example, hot data may be placed in younger (e.g., healthier) memory blocks, while cold data may be placed on older (e.g., less healthy) memory blocks relative to those younger memory blocks. Thus, the rate at which relatively older blocks are exposed to wear is effectively slowed, thereby improving the lifetime of a given data storage system implementing heat segregation.

For these reasons, it is desirable to have the ability to implement as many levels of heat as possible in a non-volatile memory device, e.g., to achieve an accurate heat estimation. However, previous attempts to implement heat segregation in conventional non-volatile memory controllers have fallen short of producing desired results, Specifically, the number of achievable heat levels in conventional hardware is limited by several factors, one being the number of open block-stripes.

An open block-stripe is a set of blocks that use separate flash channels, and therefore can be written (e.g., programmed) in parallel. All blocks in an open block-stripe have already been erased, and are ready to be written to with valid user data. It should be noted that the time taken to write new data to an erased block-stripe may be relative to the heat of the data. For example, hot data may be written to the block-stripe several seconds or less, whereas cold data may be written to the block-stripe over minutes, hours, days, etc.

Various embodiments described herein include non-volatile memory controller architectures capable of overcoming conventional shortcomings, as will be described in further detail below. It follows that various embodiments described herein may preferably be implemented in combination with a memory controller which is capable of tracking the heat of data. For example, various memory controllers described herein may be able to track the heat of logical and/or physical pages, memory blocks, etc. However, it should again be noted that various embodiments herein may be implemented with a wide range of memory mediums, e.g., NVRAM based SSD controllers, and the explicit reference to particular types of NVRAM is in no way intended to limit the invention.

Write Allocation

Write allocation includes placing data of write operations into free locations of open block-stripes. As soon as all pages in a block-stripe have been written, the block-stripe is closed and placed in a pool holding occupied block-stripes. Typically, block-stripes in the occupied pool become eligible for garbage collection. The number of open block-stripes is normally limited and any block-stripe being closed may be replaced, either immediately or after some delay, with a fresh block-stripe that is being opened.

During performance, garbage collection may take place concurrently with user write operations. For example, as a user (e.g., a host) writes data to a device, the device controller may continuously perform garbage collection on block-stripes with invalid data to make space for the new incoming data pages. As mentioned above, the block-stripes having the garbage collection being performed thereon will often have some pages that are still valid at the time of the garbage collection operation; thus, these pages are preferably relocated (e.g., written) to a new block-stripe.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

As described above, previous attempts to implement heat segregation in conventional non-volatile memory controllers have fallen short of producing desired effects. In sharp contrast, various embodiments described herein include novel non-volatile memory controller capabilities which overcome conventional shortcomings.

Specifically, different embodiments herein may include a modification to the data placement policy of the incoming user data, which may desirably achieve improved separation of data streams. Various embodiments herein may group data having different, yet similar, heats (e.g., ice-cold and cold, or hot and very hot) such that the different groups of data are written to different open block-stripes. However, data having first and second heats (corresponding to streams) of each group of data may be written to a common plurality of open block-stripes across a series of planes. It is preferred, but in no way required, that data of first and second heats written to a common series of planes (plurality of open block-stripes) are more similar to each other than a third heat with which data is associated. Thus, for example, it is preferred that hot and moderately hot data be written to a common plurality of open block-stripes across a series of planes, as opposed to grouping cold data with either of the hot or moderately hot data to be written thereto. According to an example, which is in no way intended to limit the invention, very hot data may be written to block-stripes open on planes with lower indexes in a series of planes, while moderately hot data is written to the block-stripes open on planes with higher indexes in the series of planes. As a result, various embodiments described herein are able to achieve a best-effort separation of data heats without requiring an increased number of open block-stripes. Accordingly, the ratio of introduced complexity with respect to the achieved level of separation achieved herein is exceptionally satisfactory for various workloads, as will be described in further detail below. It should also be noted that a particular "data stream" may be used herein to refer to data having the same heat.

Moreover, continuing with the foregoing example where very hot data is written to the open block-stripes of planes with lower indexes, while moderately hot data is written to the open block-stripes of planes with higher indexes, a third stream, e.g., of cold data, may be written to a different open block-stripe in parallel with the writing of the hot and very hot data. Further, a third and fourth stream, e.g., of cold and moderately cold data, may be written in parallel to different open block-stripes.

Figure 3:
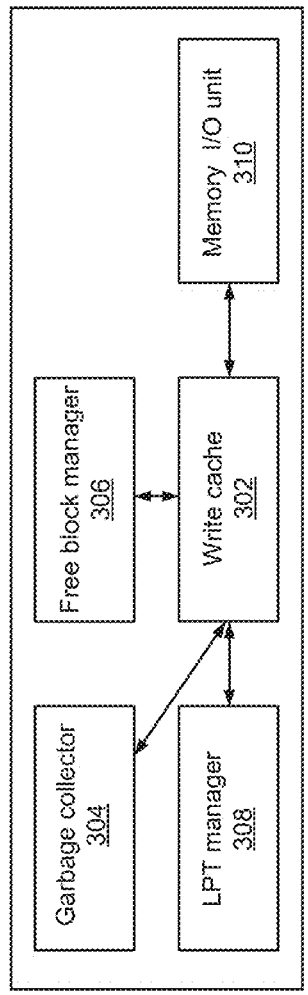
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free memory-blocks by relocating valid data and providing non-volatile memory blocks to be erased for later reuse. Thus the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB logical addresses. The memory I/O unit 310 communicates with the memory chips in order to perform low level operations, e.g., such as reading one or more on-volatile memory pages, writing a non-volatile memory page, erasing a non-volatile memory block, etc.

Figure 4:
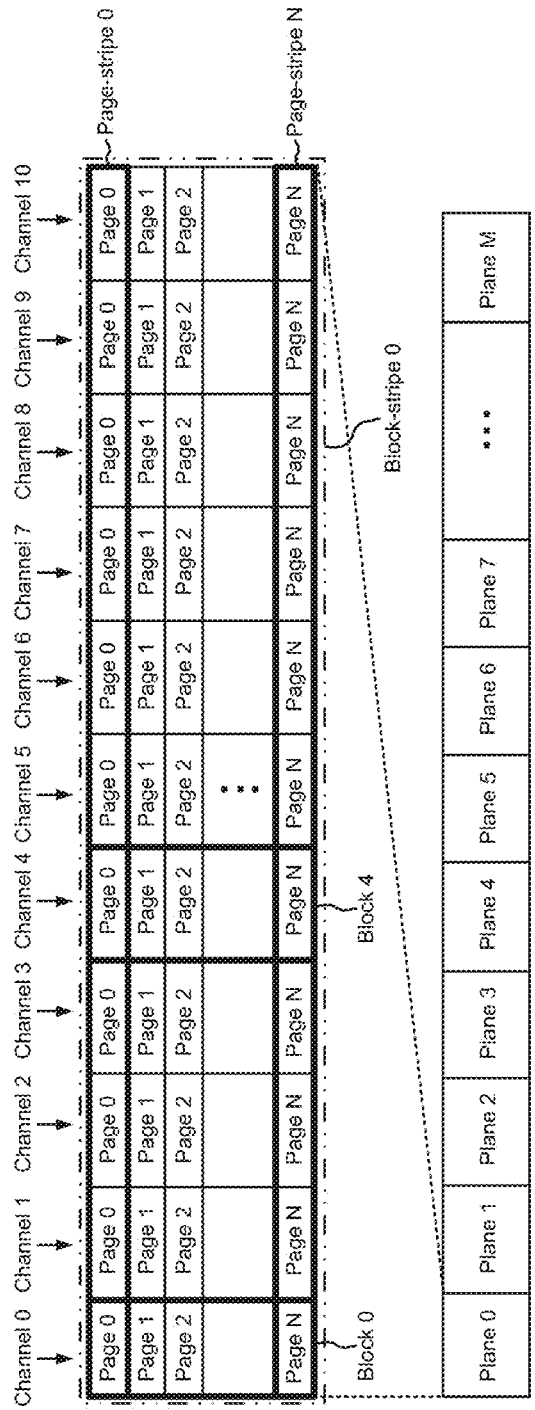
FIG. 4 is a conceptual diagram which includes a block-stripe and page-stripe, in accordance with one embodiment.

To better understand the distinction between block-stripes and page-stripes as used herein, FIG. 4 is a conceptual diagram 400, in accordance with one embodiment. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture according to the desired embodiment.

Looking now to FIG. 4, the conceptual diagram 400 includes a set of M+1 planes labeled "Plane 0" through "Plane M". Each plane is shown as including 11 blocks of N+1 pages labeled "Page 0" through "Page N", and 11 channels labeled "Channel 0" through "Channel 10" as shown in the exploded view of Plane 0. In different embodiments, the number of pages in each block and/or the number of channels in each plane may vary depending on the desired embodiment. According to an exemplary embodiment, which is in no way intended to limit the invention, a block may include 256 pages, but could include more or less in various embodiments.

Each block of pages constitutes a unique block. Similarly, each channel corresponds to a single, individual block. For example, looking to conceptual diagram 400, Block 0 includes all pages (Page 0 through Page N) in Channel 0 while Block 4 corresponds to all pages in Channel 4, and so on.

In the context of a memory controller, e.g., which may be capable of implementing RAID at the channel level, a block-stripe is made up of multiple blocks which amount to a stripe of blocks. Looking still to FIG. 4, the multiple blocks of Plane 0 constitute Block-stripe 0. While all blocks in a block-stripe typically belong to the same plane, in some embodiments one or more blocks of a block-stripe may belong to different planes. It follows that each plane may include a block-stripe. Thus, according to an illustrative embodiment, Block 0 through Block 10 may constitute a block-stripe.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel t Block-stripe 0 of Plane 0.

As previously mentioned, any of the embodiments described herein may implement heat tracking and/or segregation of data, e.g., using a memory controller. Specifically, according to some embodiments, the temperature of a datum (e.g., a 4 KiB logical page, physical page, a on-volatile memory block, a block-stripe, etc.) in the context of heat segregation may be categorized based on the update frequency of that datum. However, heat tracking and/or segregation may include a variety of design choices. For example, the granularity of a datum at which heat (temperature) is tracked, the resolution of the heat, the procedure used to update the heat, the resolution at which data segregation is performed (e.g., the number of streams), and/or the mapping of one or more heat values to a given stream may be designated as modifiable design parameters in a heat segregating scheme.

Specifically, different embodiments herein include a modification to the data placement policy of the incoming user data, which may desirably achieve improved separation of data streams. Various embodiments herein may group data having different, and possibly similar, heats (e.g., ice-cold and cold, hot and very hot, hot and cold) such that the data in each stream is written from opposite ends of a plurality of open block-stripes sparring across a series of planes. Thus the heat of the data being stored in memory may determine the location it is written to.

Figure 5A:
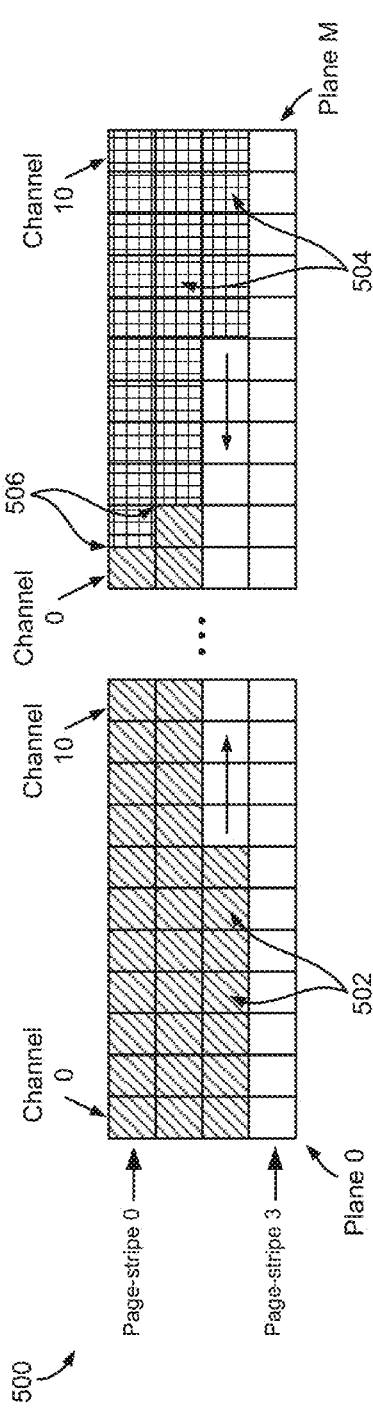
FIG. 5A is a high level illustration of non-volatile memory, in accordance with one embodiment.

According to an example, which is in no way intended to limit the invention, very hot data may be written to block-stripes open on planes with lower indexes of a series of planes, advancing towards planes with higher indexes (e.g., from left to right in FIG. 5A), while moderately hot data is written to the block-stripes open on planes with higher indexes of the series of planes, advancing towards the planes with lower indexes (e.g., from right to left in FIG. 5A). As a result, various embodiments described herein are able to achieve a best-effort separation of data heats without requiring an increased number of open block-stripes. Moreover, the ratio of introduced complexity with respect to the achieved level of separation achieved herein is exceptionally satisfactory for various workloads. Therefore, although each block-stripe of various embodiments described herein may hold data from more than one data stream, data segregation of such block-stripes remains desirably high, as will be described in further detail below.

Figure 5B:
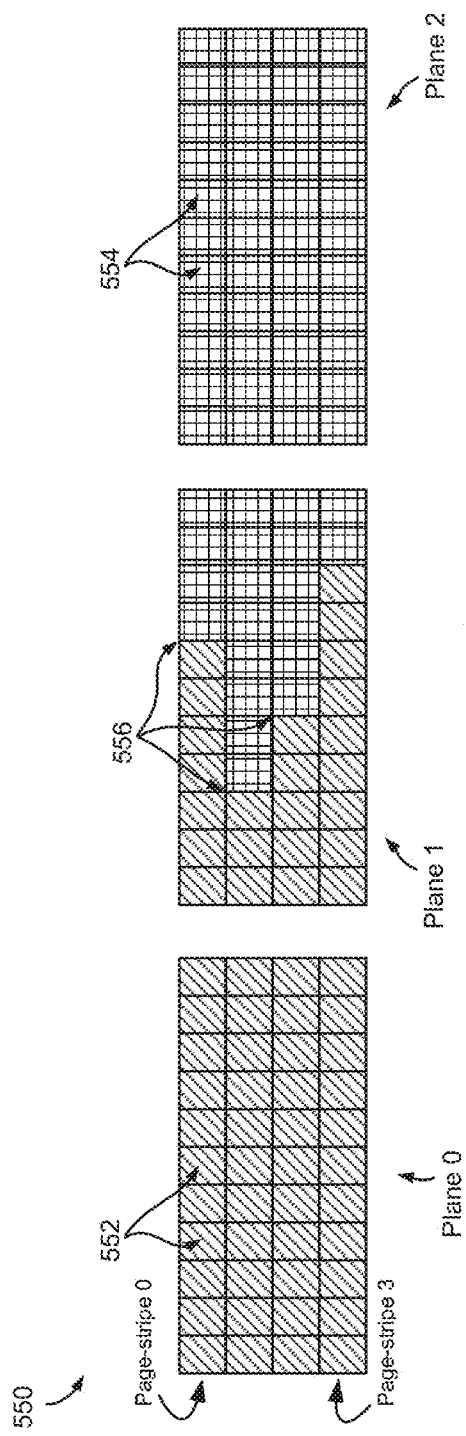
FIG. 5B is a high level illustration of non-volatile memory, in accordance with one embodiment.
Figure 5C:
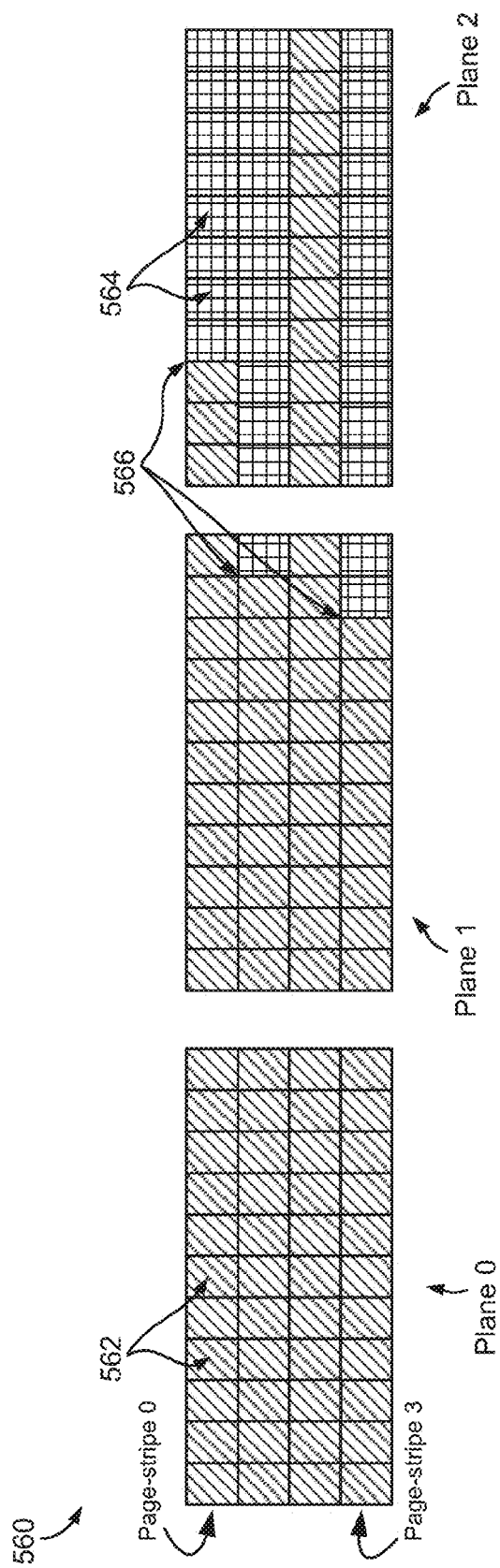
FIG. 5C is a high level illustration of non-volatile memory, in accordance with one embodiment.

Looking to FIGS. 5A-5C, high level illustrations 500, 550, 560 of non-transitory memory are shown in accordance with two embodiments. As an option, the present high level illustrations 500, 550, 560 may be implemented in conjunction with features from any other embodiment listed herein, such as those described with reference to the other FIGS., such as FIG. 4. However, such high level illustrations 500, 550, 560 and others presented herein may be used in various applications and/or in permutations which may or may not be specifically described in the illustrative embodiments listed herein. Further, the high level illustrations 500, 550, 560 presented herein may be used in any desired environment. Thus FIGS. 5A-5C (and the other FIGS.) may be deemed to include any possible permutation.

The high level illustrations 500, 550, 560 include plane-level views of non-transitory memory. Moreover, the embodiments illustrated in FIGS. 5A-5C are able to fill open page-stripes from opposite sides of open block-stripes spanning across a series of planes with data having similar, yet different heat levels while maintaining segregation therebetween. Data of the same heat may be assigned to a corresponding data stream. Thus, hot data may be assigned to a hot data stream while moderately hot data may be assigned to a moderately hot data stream.

Referring specifically now to FIG. 5A, high level illustration 500 includes hot data 502 from a hot data stream being written to pages of the planes beginning at a leftmost page of a page-stripe in a first plane (Plane 0) and continuing towards a rightmost page of a page-stripe in the last plane (Plane M) of a series of planes. However, moderately hot data 504 from a moderately hot data stream is also written to the page-stripes which the hot data is currently being written to, yet beginning at a rightmost page of the page-stripe in the last plane (Plane M) and continuing towards a leftmost page of the page-stripe in the first plane (Plane 0). Therefore, the writing of each data stream begins at opposite ends of the series of planes, and continues towards one another as indicated by the arrows shown inside each plane of FIG. 5A, which have been included to represent an intended direction in which each data stream is filled into a given page-stripe according to an illustrative embodiment.

Accordingly, hot data 502 and moderately hot data 504 of the data streams is written in parallel to page-stripes having a same index across a series of planes of memory from opposite ends thereof. As a result of the parallel writing, hot data 502 and moderately hot data 504 eventually meet at a junction 506. Thus, a junction 506 may be defined in a page-stripe of a plane where the data of the two data streams meet. Depending on the rate at which data is written to the page-stripes of the block-stripes, the location of the junction 506 along the length of the page-stripes across the series of planes may vary. For example, the higher update rate of hot data relative to the relatively lower update rate of moderately hot data may have an effect on the location of one or more of the junctions 506. Accordingly, FIG. 5A illustrates the hot data 502 having filled a larger portion of the page-stripes on Plane M than the moderately hot data 504.

The organization of data presented in FIG. 5A more efficiently fills the block-stripes, e.g., compared to conventional products. For example, conventional products assign a unique block-stripe to each data stream, whereby, if an incoming data rate of one or more of the data streams decreases for a period of time, the corresponding block-stripe(s) may be unused. In sharp contrast, referring again to the data organization presented in the embodiment illustrated in FIG. 5A, filling page-stripes of block-stripes simultaneously from opposing ends of a series of planes allows for continued use of the memory despite a possible decrease in data rate of one of the data streams. Depending on the amount a data rate is increased, the time the data rate is decreased for, etc., junctions 506 may be positioned differently along the series of planes. According to an example, which is in no way intended to limit the invention, if a first data stream of a pair of data streams filling a given series of planes decreases to a point that no data is being received, the other of the two data streams may fill all pages of a given page-stripe across all planes, depending on the amount of time until writing of data in the first data stream resumes.

The organization of data also achieves a desired separation of data having different temperatures. According to the present embodiment, pages to the left of the junctions 506 hold hot data while pages to the right of the junctions 506 hold moderately hot data. It follows that the junctions 506 define a clear boundary separating data having slightly different temperatures.

Although the organization of data within illustration 500 of FIG. 5A depicts the junctions between data of different temperatures as being located in a final plane of a block-stripe (Plane M), as alluded to above, junctions between data of different temperatures may be located at any point along a given series of planes and/or block-stripe within the series of planes, depending on the update rate of the data. Thus, according to some embodiments, junctions between data of two temperatures may be located in a block-stripe at about the center of a series of planes. For example, FIG. 5B illustrates an embodiment in which the junctions between moderately hot data and hot data are located in a block-stripe at about the middle of the series of planes, e.g., plane (M+1)/2.

Referring now to FIG. 5B, the high level illustration 550 depicts a similar separation of data streams achieved between moderately cold data 552 and cold data 554 for an embodiment having three planes. It should be noted that, although the present embodiment is depicted as having three distinct planes, similar and/or the same results may be achieved for embodiments having any number of additional planes, e.g., 4 planes, 5 planes, 10 planes, M planes, etc., depending on the desired embodiment. The value for M may be selected based on the configuration of the particular system in this and other embodiments.

With continued reference to FIG. 5B, all pages of all planes in the present embodiment have been filled with data. As described above, data streams having different heats fill the block-stripes from opposite sides of a series of planes. In the present embodiment, moderately cold data 552 is filled into each of the page-stripes from left to right beginning at Plane 0, while cold data 554 is filled into each of the corresponding page-stripes from right to left beginning at Plane 2. Thus, junctions 556 between moderately cold data 552 and cold data 554 are located in page-stripes of Plane 1. Moreover, block-stripes of the planes to either side of Plane 1 are filled exclusively with data of a common heat. Looking to the high level illustration 550, all pages of Plane 0 contain exclusively moderately cold data 552, while all pages of Plane 2 contain exclusively cold data 554. As a result, complete separation of data heats is achieved.

The same effect may be achieved for embodiments having more than three planes. For example, a middle plane (e.g., Plane 3) of an embodiment having seven planes (Plane 0 through Plane 6) may include junctions between data of two different heats, while the remainder of the planes contain data exclusive to a given heat and thereby attain complete separation between the data heats.

Furthermore, separation of data heats according to any of the embodiments described herein may be implemented in a single page-stripe, e.g., in embodiments having a single plane.

As previously mentioned, the organization of data in the embodiments depicted in FIGS. 5A-5C achieves a clear boundary separating data having different temperatures. Although page-stripes of planes in which functions 506 are located may include data of different heats, the embodiment as a whole is able to desirably achieve improved separation of data by streams. Moreover, various embodiments described and/or suggested herein may be able to achieve separation of heats that is up to about two times better than conventional products.

Although both embodiments illustrated in FIGS. 5A-5B depict the junctions 506, 556 as being located in a common plane (i.e., Plane M and Plane 1 respectively), junctions may occur between data streams of different temperatures across different planes. For example, looking to FIG. 5C, the high level illustration 560 depicts an exemplary embodiment in which the junctions 566 between hot data 562 and moderately hot data 564 are located in more than one plane. In this example, the junction 566 between the data 562, 564 in Page-stripe 0 are located in Plane 2, while the junctions 566 between the data 562, 564 in Page-stripe 1 and Page-stripe 3 are located in Plane 1. The data 562 in Page-stripe 2 extends across all Planes, inferring that the rate of writing data 562 was higher than that for data 564. Again, depending on the rate at which data is written to the page-stripes of the block-stripes in a series of planes over time, the location of each of the junctions 566 along the length of the series of planes may vary.

It may also be desirable, but in no way required, for embodiments implementing an organization of data as presented in the various embodiments described herein (e.g., as seen in FIGS. 5A-5C) to implement rotating heat assignments, as will soon become apparent. Referring momentarily to the embodiment illustrated in FIG. 5A, hot data 502 is written to pages of the planes beginning at a leftmost page of a leftmost plane and continuing to the right, while moderately hot data 504 is written to pages of the planes beginning at a rightmost page of a rightmost plane and continuing to the left. It follows that, with continued use over time, planes with lower indexes (e.g. Plane 0 and Plane 1) will be filled with hotter data than those planes with higher indexes (e.g., Plane M and Plane M−1). Thus, planes having lower indexes may be written (e.g., updated) more often than those planes having higher indexes, and as a result, experience more wear over a given period of time.

Differences in wear across the different planes of a given embodiment may be undesirable in view of wear leveling and health management. Specifically, portions of memory which experience higher amounts of wear may fail sooner than portions which experience lower amounts of wear. It follows that it may be desirable for various embodiments described herein to implement rotating heat assignments.

FIGS. 6A-6D depict high level illustrations of memory 600, in accordance with one embodiment. As an option, the present high level illustrations of memory 600 may be implemented in conjunction with features from any other embodiment listed herein, such as those described with reference to the other FIGS., such as FIGS. 5A-5C. However, such high level illustrations of memory 600 and others presented herein may be used in various applications and/or in permutations which may or may not be specifically described in the illustrative embodiments listed herein. Further, the high level illustrations of memory 600 presented herein may be used in any desired environment. Thus FIGS. 6A-6D (and the other FIGS.) may be deemed to include any possible permutation.

The series of planes depicted in the high level illustrations of memory 600 may incorporate the same or similar structure as that illustrated in the exploded view of Plane 0 in FIG. 4. Thus, as described above, each plane of the memory 600 may include block-stripes, page-stripes, etc. Furthermore, it should be noted that the starting position 602 included in the embodiment of FIGS. 6A-6D is intended to represent an imaginary boundary separating a starting position for each of the data streams, as will be described in further detail below. Arrows have been included in FIGS. 6A-6B which are intended to represent a direction in which each of the hot and moderately hot data streams are filled into memory, according to an illustrative embodiment.

Figure 6A:
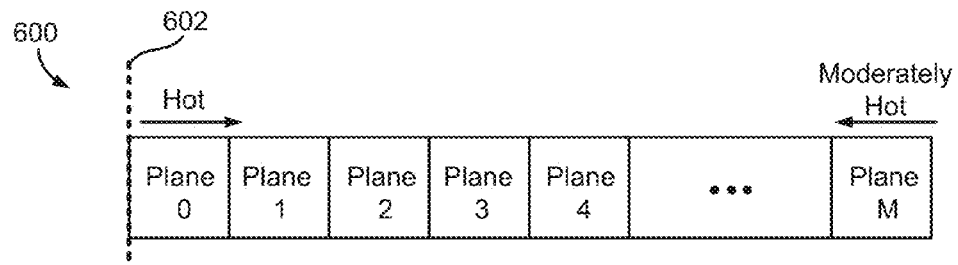
FIGS. 6A-6D are high level illustrations of non-volatile memory, in accordance with one embodiment.
Figure 6B:
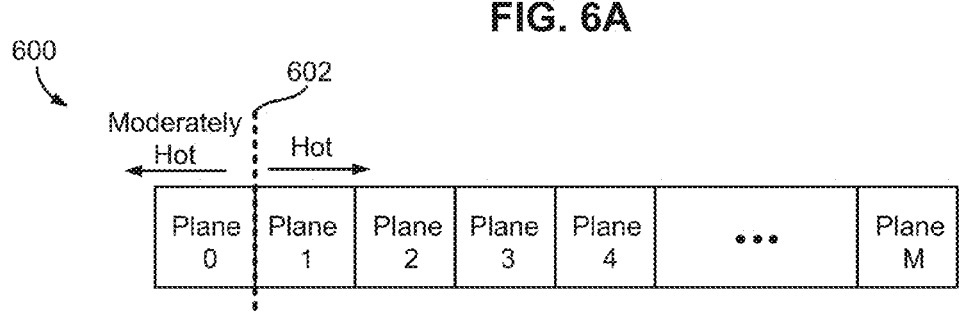

Referring now specifically to FIG. 6A, starting position 602 is located at position 0, e.g., at the leftmost portion of Plane 0. Thus, hot data is filled into the block-stripes of memory 600 beginning at first block of Plane 0 and continues filling the series of planes from left to right. Furthermore, moderately hot data is filled into the block-stripes of memory 600 beginning at a last block of Plane M and continues filling the series of planes from right to left. As previously mentioned, the writing of each data stream preferably begins at the starting position 602 between ends of the series of planes. Moreover, data of each data stream is written from the starting position 602 towards a respective end of the series of planes. The organization of data resulting from the starting position 602 being located at position 0 would match, or at least resemble (e.g., depending on incoming data rates) the organization of data presented in the embodiments corresponding to FIGS. 5A-5C.

However, as previously mentioned, it may be desirable to shift the starting position 602 (e.g., the page to which data is first written to) after an amount of time, some writing is performed, etc., which may be predetermined, calculated, updated, etc., depending on the desired embodiment. Thus, the writing of each data stream may begin at a starting position between outer planes, here at some position between Plane 0 and Plane M. For example, looking to FIG. 6B, the starting position 602 is illustrated as having been moved to position 1, located between Plane 0 and Plane 1. As a result, moderately hot data is filled into the block-stripes of memory 600 beginning at a last block of Plane 0 and continues from right to left. Furthermore, hot data is filled into the block-stripes beginning at a first block of Plane 1 and continues filling the series of planes from left to right. When the moderately hot data reaches the leftmost page of Plane 0 in Page-stripe 0, moderately hot data may be written to the right-most page of Page-stripe 0 in Plane M, and writing from right to left until reaching the hot data, upon which a junction is defined. Accordingly, the Page-stripes of a given index are each filled before proceeding to writing to Page-stripes of subsequent indexes, where writing may again begin at the starting position 602, or at another position if the starting position is advanced.

Figure 6C:
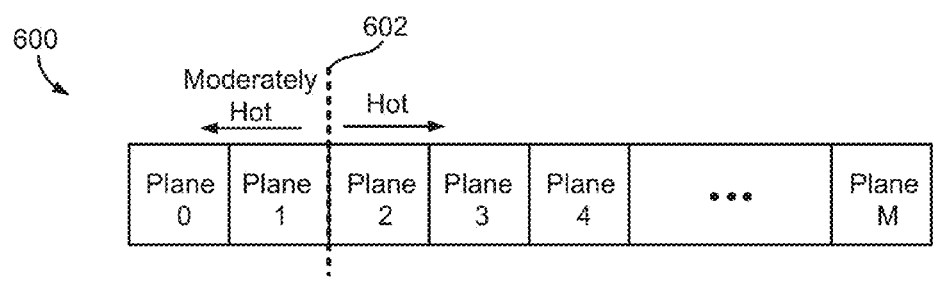

FIG. 6C depicts the starting position 602 having been advanced to a third position between Plane 2 and Plane 1. According to the present embodiment, the third position results in hot data filling into the block-stripes beginning at a first block of Plane 2 and continuing from left to right, while moderately hot data is filled into the block-stripes beginning at a last block of Plane 1 and continuing from right to left.

Figure 6D:
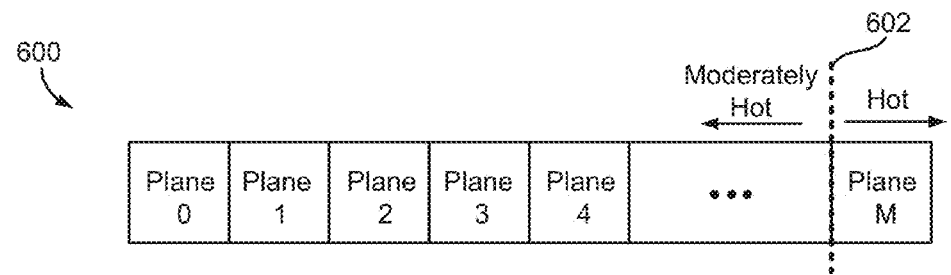

Referring to FIG. 6D, the starting position 602 may be advanced in a similar manner until reaching a position between Plane M and Plane M−1. According to one embodiment, if it is desired to further advance the starting position 602 past Plane M, the starting position may instead be advanced to position 0, e.g., as a result of the indexes being circularly rotated. However, rather than implementing a starting position which circularly rotates to the right, alternate embodiments may implement a starting position which circularly rotates to the left. In other embodiments, starting position 602 may proceed towards Plane M, and at some point reverse direction towards position 0. Further still, the starting position may skip over certain planes when advanced, e.g., to prevent additional wear to certain planes. It follows that various embodiments may implement different shifting heat assignments, e.g., depending on the desired embodiment.

Implementing a starting position which shifts between block-stripe boundaries, e.g., between planes, may desirably achieve complete segregation of data in particular block-stripes. Thus, although the junctions between data streams of different heats may be positioned in different locations for each page-stripe, most block-stripes in the same set may include page-stripes having data of the same heat.

Furthermore, garbage collection typically operates on the block-stripe level. Thus, in view of the foregoing embodiments, invalidations of data stored in a block-stripe may occur about concurrently, thereby reducing write amplification of block-stripes.

It follows that the various embodiments described herein are able to effectively double the number of supported heat levels in non-volatile memory without increasing an associated number of open block-stripes.

In addition to the features presented above, memory controllers may buffer incoming data (writes) to a write cache, e.g., per data stream and corresponding to an associated page. After a desired amount of data is buffered in cache (e.g., an amount of data capable of achieving parallelism), the data may be written to memory. The organization of the write cache may vary depending on the desired embodiment, as would be appreciated by one skilled in the art upon reading the present description. Thus, it follows that any of the teachings presented herein may be applied to various types of write caches, and even to systems that do not have a write cache. In other words, the embodiments described and/or suggested herein may be applied to various types of write caches and/or systems which write user data directly to memory, e.g., without buffering the user data first in a write cache.

The present invention a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in an way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 7:
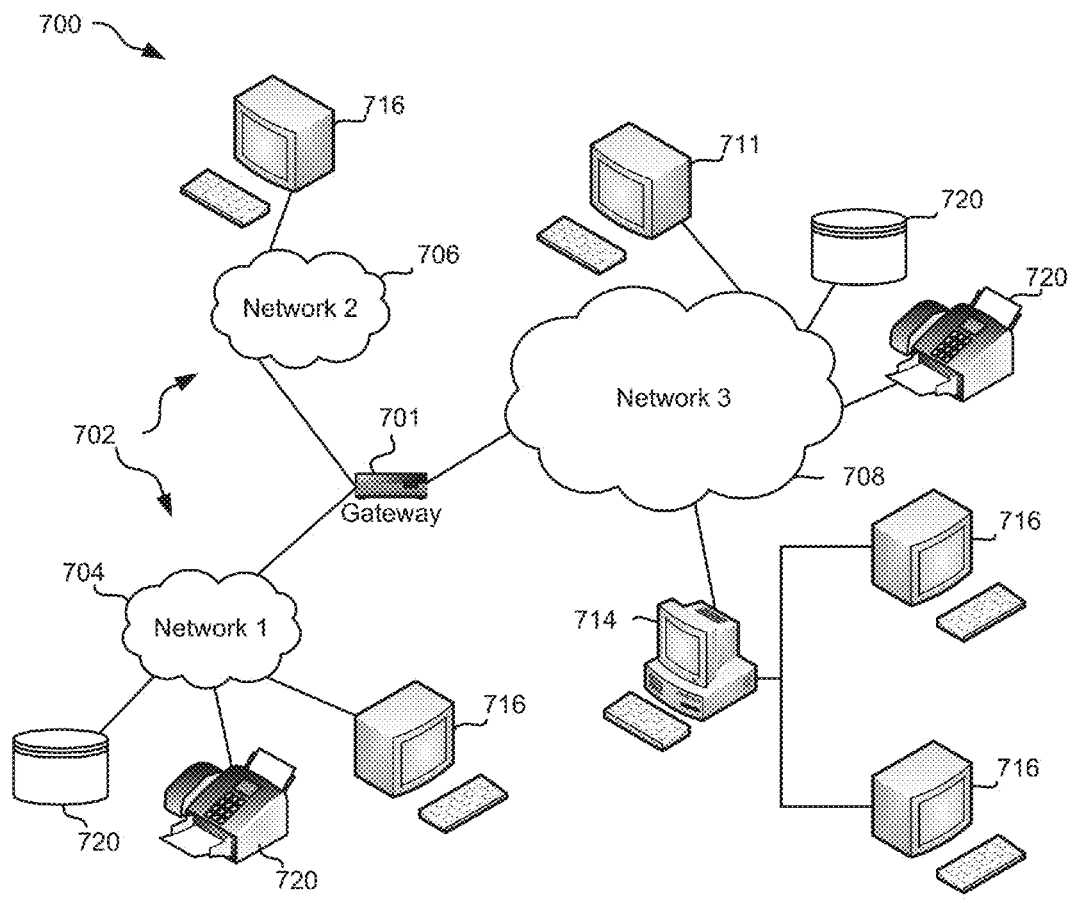
FIG. 7 is a network architecture, in accordance with one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, public switched telephone network (PSTN), internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, handheld computer, printer, and/or any other type of logic-containing device. It should be noted that a user device 711 may also be directly coupled to any of the networks, in some embodiments.

A peripheral 720 or series of peripherals 720, e.g., facsimile machines, printers, scanners, hard disk drives, networked and/or local data storage units or systems, etc., may be coupled to one or more of the networks 704, 706, 708. It should be noted that databases and/or additional components may be utilized with, or integrated into, any type of network element coupled to the networks 704, 706, 708. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 704, 706, 708, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 8:
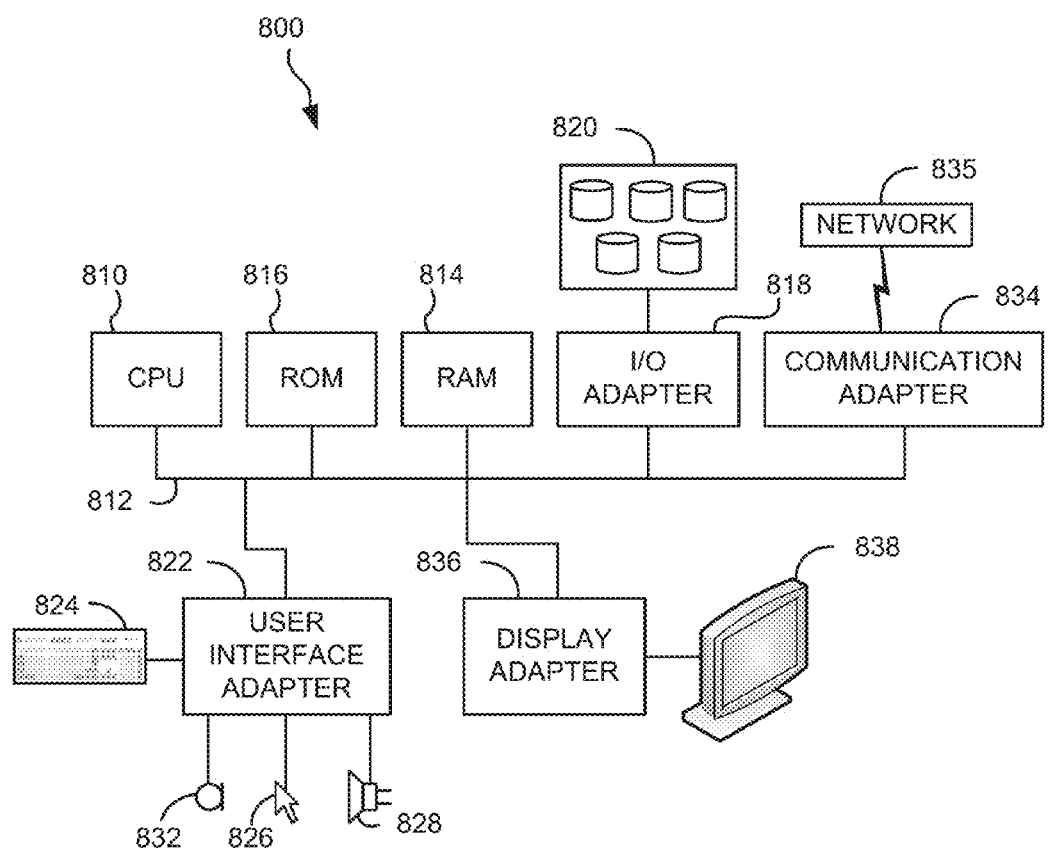
FIG. 8 is a representative hardware environment that may be associated with the servers and/or clients of FIG. 7, in accordance with one embodiment.

FIG. 8 shows a representative hardware environment associated with a user device 716 and/or server 714 of FIG. 7, in accordance with one embodiment. FIG. 8 illustrates a typical hardware configuration of a processor system 800 having a central processing unit 810, such as a microprocessor, and a number of other units interconnected via a system bus 812, according to one embodiment. In some embodiments, central processing unit 810 may include any of the embodiments described above with reference to the one or more processors 210 of FIG. 2.

The processor system 800 shown in FIG. 8 includes a Random Access Memory (RAM) 814, Read Only Memory (ROM) 816, and an I/O adapter 818. According to some embodiments, which are in no way intended to limit the invention, I/O adapter 818 may include any of the embodiments described above with reference to I/O adapter 218 of FIG. 2. Referring still to processor system 800 of FIG. 8, the aforementioned components 814, 816, 818 may be used for connecting peripheral devices such as storage subsystem 820 to the bus 812. In some embodiments, storage subsystem 820 may include a similar and/or the same configuration as data storage system 220 of FIG. 2. According to an example, which is in no way intended to limit the invention, storage subsystem 820 may include non-volatile data storage cards, e.g., having Flash memory cards, RAM, ROM, and/or some other known type of non-volatile memory, in addition to RAID controllers as illustrated in FIG. 2.

With continued reference to FIG. 8, a user interface adapter 822 for connecting a keyboard 824, a mouse 826, a speaker 828, a microphone 832, and/or other user interface devices such as a touch screen, a digital camera (not shown), etc., to the bus 812.

Processor system 800 further includes a communication adapter 834 which connects the processor system 800 to a communication network 835 (e.g., a data processing network) and a display adapter 836 which connects the bus 812 to a display device 838.

The processor system 800 may have resident thereon an operating system such as the MICROSOFT WINDOWS Operating System (OS) a MAC OS, a UNIX OS etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 9:
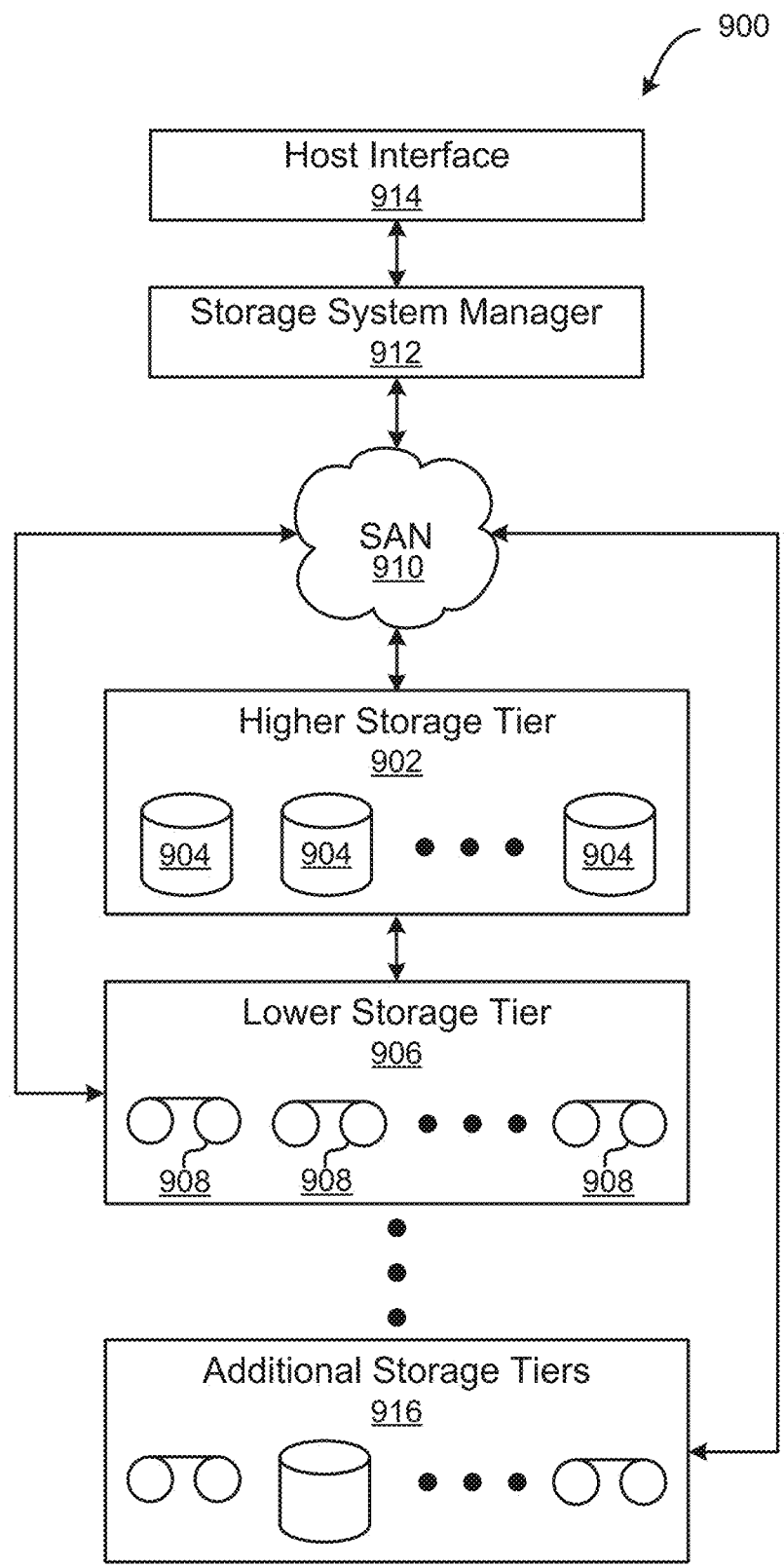
FIG. 9 depicts a tiered data storage system in accordance with one embodiment.

Moreover, FIG. 9 illustrates a storage system 900 which implements high level (e.g., SSD) storage tiers in combination with lower level (e.g., magnetic tape) storage tiers, according to one embodiment. Note that some of the elements shown in FIG. 9 may be implemented as hardware and/or software, according to various embodiments. The storage system 900 may include a storage system manager 912 for communicating with a plurality of media on at least one higher storage tier 902 and at least one lower storage tier 906. However, in other embodiments, a storage system manager 912 may communicate with a plurality of media on at least one higher storage tier 902, but no lower storage tier. The higher storage tier(s) 902 preferably may include one or more random access and/or direct access media 904, such as hard disks, nonvolatile memory (NVM), solid state memory in SSDs, Flash memory, SSD arrays, Flash memory arrays, etc., and/or others noted herein or known in the art. According to illustrative examples, FIGS. 3-4 show exemplary architectures of SSD systems which may be used as a higher storage tier 902 depending on the desired embodiment.

Referring still to FIG. 9, the lower storage tier(s) 906 preferably includes one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Thus the one or more additional storage tiers 916 may, in some embodiments, include a SSD system architecture similar or the same as those illustrated in FIGS. 1-2. Also, any of the higher storage tiers 902 and/or the lower storage tiers 906 may include any combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. However, any arrangement of a storage system may be used, as will be apparent to those of skill in the art upon reading the present description.

In more embodiments, the e storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to fire additional storage tiers 916, including lower storage tier 906. However, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions.

Of course, this logic may be implemented as a method on any device and/or system or as a computer program product, according to various embodiments.

What is claimed is:

1. A computer-implemented method, comprising:
assigning data having a first heat to a first data stream;
assigning data having a second heat to a second data stream; and
writing the data streams simultaneously, in parallel, to page-stripes having a same index across a series of planes of memory,
wherein the writing of the first data stream begins at an opposite end of the series of planes as the writing of the second data stream, the writing of the streams being toward one another.

2. The computer-implemented method of claim 1, wherein a junction is defined in one of the page-stripes of a plane from the series of planes where the data of the first and second data streams meet.

3. The computer-implemented method of claim 2, wherein the plane in which the first and second data streams meet is dependent upon a rate at which the data of the first data stream is updated and a rate at which the data of the second data stream is updated.

4. The computer-implemented method of claim 1, wherein a rate at which the data of the first data stream is updated is more similar to a rate at which the data of the second data stream is updated than a rate at which data having a third heat is updated.

5. The computer-implemented method of claim 1, wherein the memory is in a write cache.

6. The computer-implemented method of claim 1, wherein the memory is non-volatile memory.

7. The computer-implemented method of claim 1, wherein the first and second heats correspond to a rate at which the respective data is updated in the memory.

8. A system, comprising:
a memory; and
a controller configured to assign data having a first heat to a first data stream, assign data having a second heat to a second data stream, and write the data streams simultaneously, in parallel, to page-stripes having a same index across a series of planes of the memory,
wherein the writing of the first data stream begins at an opposite end of the series of planes as the writing of the second data stream, the writing of the streams being toward one another.

9. The system of claim 8, wherein a junction is defined in one of the page-stripes of a plane from the series of planes where the data of the first and second data streams meet.

10. The system of claim 9, wherein the plane in which the first and second data streams meet is dependent upon a rate at which the data of the first data stream is updated and a rate at which the data of the second data stream is updated.

11. The system of claim 8, wherein a rate at which the data of the first data stream is updated is more similar to a rate at which the data of the second data stream is updated than a rate at which data having a third heat is updated.

12. The system of claim 8, wherein the memory is in a write cache.

13. The system of claim 8, wherein the memory is non-volatile memory.

14. The system of claim 8, wherein the first and second heats correspond to a rate at which the respective data is updated in the memory.

15. A computer program product comprising a computer readable storage medium having program instructions embodied therewith, wherein the computer readable storage medium is not a transitory signal per se, the program instructions readable and/or executable by a controller to cause the controller to:
assign, by the controller, data having a first heat to a first data stream;
assign, by the controller, data having a second heat to a second data stream; and write, by the controller, the data streams simultaneously, in parallel, to page-stripes having a same index across a series of planes of memory, wherein the writing of each data stream begins at a starting position between ends of the series of planes, wherein each data stream is written from the starting position toward a respective end of the series of planes.

16. The computer program product of claim 15, wherein the starting position is advanced after at least some writing is performed.

17. The computer program product of claim 15, wherein the first and second heats correspond to a rate at which the respective data is updated in the memory.

18. The computer program product of claim 15, wherein a junction is defined in one of the page-stripes of a plane from the series of planes where the data of the first and second data streams meet.

19. The computer program product of claim 18, wherein the plane in which the first and second data streams meet is dependent upon a rate at which the data of the first data stream is updated and a rate at which the data of the second data stream is updated.

20. The computer program product of claim 19, wherein the starting position is advanced incrementally across the series of planes after at least some writing is performed, wherein the starting position is skipped over certain planes of the series of planes based on preventing additional wear to the certain planes.

* * * * *